Figure 1:
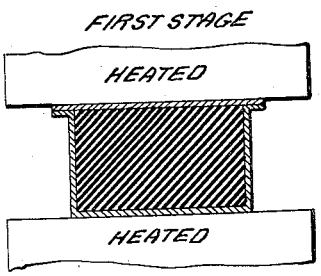

Jan. 27, 1942.   R. L. OVERSTREET   2,271,498
METHOD FOR MAKING CLOSED-CELL CELLULAR HARD RUBBER
AND PRODUCT OF THE METHOD
Filed April 8, 1941

FIRST STAGE

BEGINNING OF 2ND. STAGE

END OF 2ND. STAGE

INVENTOR
Robert L. Overstreet
BY
Robert W. Byerly
ATTORNEY

Patented Jan. 27, 1942

2,271,498

UNITED STATES PATENT OFFICE 2,271,498

METHOD FOR MAKING CLOSED-CELL CELLULAR HARD RUBBER AND PRODUCT OF THE METHOD

Robert L. Overstreet, Bedford, Va., assignor to Salta Corporation, Jersey City, N. J., a corporation of Delaware Application April 8, 1941, Serial No. 387,388

20 Claims. (Cl. 18—53)

This invention relates to a method for making closed-cell cellular hard rubber and to the product of the method.

This application is a continuation in part of my co-pending application Serial No. 157,311, filed August 4, 1937, and a continuation in part of my co-pending application Serial No. 157,312, filed August 4, 1937, and the combined disclosures of said co-pending applications constitute the entire subject-matter of the present application.

Hard rubber containing closed cells has proved useful as an insulator, as a structural material on airplanes and for other purposes. The only practical method of making it which has been developed involves subjecting a rubber compound to a neutral gas, such as nitrogen, under very heavy pressure. This is an expensive operation.

I have invented a method for making cellular rubber which is simple and economical and avoids the use of a body of gas under pressure. In carrying out my invention, I use a rubber compound of such composition that, when fully vulcanized, it produces hard rubber. For the sake of brevity, I shall refer to such a compound as a "hard-rubber compound." Most hard-rubber compounds now used contain sulphur amounting to from one-third to one-half of the amount of rubber in the compound. The compound is vulcanized under conditions which tend to cause a production of gas within it. The vulcanization is carried out in two stages, in the first of which a mass of the compound is forcibly and rigidly, externally confined to prevent expansion, and in the second of which the compound is released from this confinement and is allowed to expand freely under the effect of the gas developed within it, but the extent of this expansion is limited to a predetermined volume greater than the original volume of the mass. In the first stage, the vulcanization is carried to such a point that the rubber has lost the pasty characteristics of raw rubber and acquired a tensile strength comparable with that of very soft vulcanized rubber. In the second stage, the vulcanization is completed so as to produce hard rubber.

It is my belief that the gas-producing conditions which exist throughout the vulcanization are so controlled by the rigid external confinement of the mass in the first stage that, in this stage, there are evolved only minute quantities of gas which produce the nuclei of cells throughout the mass; while, in the second stage, where the mass is unconfined and entirely free to expand, gas is produced in considerable volume and expands these nuclei into the evenly distributed, closed cells which greatly increase the volume and reduce the density of the mass, producing a true closed-cell cellular rubber.

An important feature of my invention lies in the discovery that the application of vulcanization heat to an ordinary hard-rubber compound containing a substantial proportion of sulphur produces a sufficient quantity of hydrogen sulphide gas to make it possible to provide a cellular rubber by my method without use of any of the so-called blowing agents heretofore used in making sponge rubber. By applying my method to a rubber compound containing a substantial proportion of sulphur, such as has heretofore been used for making ordinary solid hard rubber, I am able to produce a cellular rubber having a density as low as fifteen pounds per cubic foot, that is to say, about one-fifth that of ordinary solid hard rubber. When a cellular rubber of still less density is required, it may be obtained by applying my method to a compound incorporating a small percentage of any usual "blowing agent," that is, a solid or liquid which evolves gas when heated.

In the making of closed-cell cellular rubber, it has heretofore been considered essential that the cells in the rubber be filled with gas which is at or somewhat above atmospheric pressure. This is indeed essential in a closed-cell cellular soft-rubber product to avoid collapse of the rubber. I have discovered, however, that it is possible to make a cellular hard rubber with closed cells which contain gas at a pressure substantially below that of the atmosphere, and that such a product may be made at less expense than the closed-cell cellular hard rubber heretofore made and possesses advantages over it.

In carrying out this feature of my invention, I incorporate in a hard-rubber compound an agent which, when decomposed by heat, produces a gas so unstable that, on cooling with the other decomposition products of the agent, all or a part of the gas is eliminated as a gas, by condensation or absorption or by recombining with other decomposition products. For brevity, I shall refer to any or all of these actions as "chemical elimination" of the gas.

By use of such an unstable-gas-producing agent, I produce gas under pressure in a partially vulcanized hard-rubber compound by heating the compound to vulcanization temperature. The compound is held at vulcanization temperature until there is produced a strong, fully vulcanized hard rubber within which are numerous small closed cells filled with the unstable chemically-evolved gas and containing the other decomposition products of the gas-producing agent. The fully vulcanized compound is then cooled so that it develops its full structural strength. The cooling also results in chemical elimination of a part of the gas in the cells so that a partial vacuum is developed in each cell. This, however, does not occur until the rubber compound has cooled sufficiently to develop such structural strength that it retains its expanded form notwithstanding the reduced pressure within its cells.

Specific examples of my method are as follows:

Example I

The hard-rubber compound used may have the following composition:

| | Per cent |
|---|---|
| Rubber | 48 |
| Sulphur | 24 |
| Asphaltum | 12 |
| Gilsonite | 12 |
| Calcinated magnesium | 3 |
| Accelerator ("Captax") | 1 |

It will be noticed that the sulphur content of this compound is equal to 50 per cent. of its rubber content. A substantial proportion of sulphur is important both because it makes the compound hard and strong when completely vulcanized, and because it tends to produce gas (hydrogen sulphide) when the compound is heated to vulcanizing temperatures.

A mass of the rubber compound is confined in a mold capable of withstanding internal pressures of the order of 1000 pounds per square inch. So confined, it is partially vulcanized to an extent sufficient to eliminate its pasty consistency and give it a tensile strength comparable with that of very soft vulcanized rubber. Such partial vulcanization may be obtained by holding the mass in the mold at a temperature of 288° F. for 15 minutes or by holding it at a temperature of 218° F. for 90 minutes. The temperature and time of the partial vulcanization may be varied, but the temperature should, in any event, be sufficiently high to tend to produce hydrogen sulphide gas within the mass of rubber. With the particular compound mentioned, I have found that such tendency exists at any temperature above 190° F. since the mass, if unconfined, tends to swell when heated to or above this temperature.

After the partial vulcanization, the mass of rubber compound is released from confinement. It may be taken from the confining mold and placed in a mold having from three to five times the original volume of the mass. This leaves the mass entirely free to expand up to a volume from three to five times its original volume, but prevents further expansion, and, in this way, eliminates the danger of the bursting of some of the closed cells which might result from over expansion.

After the mass has been removed from the confining mold and placed in the larger mold, the vulcanization is completed. This may be accomplished with the illustrative compound mentioned by heating it at a temperature of 338° F. for from 40 to 60 minutes, depending on the thickness of the mass.

After the final vulcanization and cooling, the mass of rubber compound will have been transformed into a strong cellular structure of hard vulcanized rubber having a density of from one-third to one-fifth of that of solid hard rubber. The cells of the structure contain hydrogen sulphide gas and are closed so that it is non-absorbent of water. It is useful as an insulator and as a light structural material.

Example II

A small proportion of any usual blowing agent is incorporated in a hard-rubber compound such as that specified in Example I. The proportions in which various illustrative blowing agents may most desirably be used is indicated in the following table:

| | Per cent of weight of rubber compound |
|---|---|
| Ammonium carbonate | 5 |
| Ammonium acid carbonate | 7 |
| Sodium acid carbonate | 10 |

A mass of the rubber compound incorporating the blowing agent is rigidly confined and partially vulcanized as in Example I. The temperature used to obtain the partial vulcanization is greater than the decomposition temperature of the blowing agent.

After the partial vulcanization, the mass of rubber compound is released from confinement. It may be taken from the confining mold and placed in a mold having from twelve to twenty times the volume of the mass where it is entirely free to expand up to the volume of the larger mold, but is prevented from further expansion.

After the mass has been taken from the confining mold and placed in the larger mold, the vulcanization is completed as in Example I.

After the full vulcanization, the mass is cooled in the mold, producing a cellular structure of fully vulcanized hard rubber of great strength. The cooling of the mass results in chemical elimination of a part of the gas within the cells, probably by a condensing of the water which is one of the decomposition products of each of the gas-producing chemicals mentioned and an absorption of other gases such as carbon dioxide and ammonia in the water and a partial reversal of the decomposition reaction of the gas-producing agent. A partial vacuum is thus developed in each cell, but the strength of the hard-rubber structure is such that it does not collapse. It may be noted that the form of rubber is such that it is well adapted to resist external pressure, since the cells are convex so that external pressure is resisted by an arch formation—a condition very different than that which is present when cellular rubber is required to resist internal pressure within its cells.

The product is light, having density of from 3½ to 8 pounds per cubic foot, that is to say, from one-twelfth to one-twentieth of that of solid hard rubber. It is strong, non-absorbent in water, a good insulator, and is free from a tendency to burst when subjected to reduced pressure. The fact that it is truly a closed-cell cellular rubber has been demonstrated by immersion in water for twenty-four hours, after which it was found that any water which it has absorbed amounted to not more than a few per cent. of its volume. It is thus highly desirable for general use as an insulator and for use as both an insulator and as a structural material in airplanes.

My method may be carried out by means of any convenient apparatus. I have illustrated diagrammatically in the accompanying drawing the stages of my method as described in connection with Example II, carried out by means of a simple apparatus.

Figure 2:
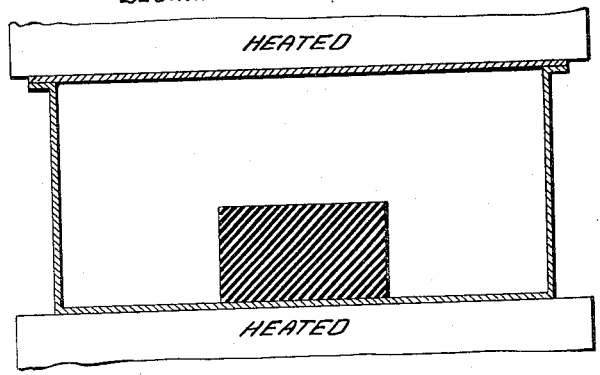
Figure 3:
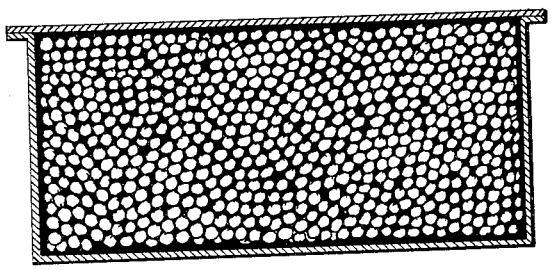

In the drawing, Fig. 1 shows the first stage of vulcanization with the mass in a confining mold of the same volume as the mass. Figs. 2 and 3 show the beginning and end of the final vulcanization with the mass in a mold whose volume is approximately twelve times that of the mass. The figures represent cross-sections of the molds with the mass contained in them. Heating means are shown diagrammatically, and they or other means not shown are used to hold the covers on the molds. The covers fit tightly enough together to prevent the rubber compound from leaking out, but are not gastight.

The illustrated method which has been described may be modified in various respects without departing from my invention. Thus, if desired, the partially vulcanized compound may be removed from the first confining mold while hot. In this case, it will undergo very considerable expansion when the confinement of the mold is released. When one of the ammonium salts mentioned is used as the blowing agent, the expansion on release of confinement may be so great that the hot compound must be compressed somewhat to get it into the larger mold used in the final vulcanization. If desired, the partially vulcanized, released and expanded compound may be allowed to cool before it is placed in the mold used in the final vulcanization. On such cooling, it will shrink towards its original size as the gases in its cells are partially chemically eliminated during the cooling. This in no way interferes with the process, as the shrunken, partially vulcanized compound expands again during the final vulcanization. This indicates that the constituents of the blowing agent, probably in partially recombined form, are contained in the closed cells of the final product. "Blowing agent" as used herein means a solid or liquid which evolves gas on heating.

What I claim is:

1. The method of making closed-cell cellular hard rubber, which comprises rigidly externally confining a mass of hard-rubber compound, heating the confined mass and vulcanizing it under conditions which preclude penetration of gas into the mass from the outside to the point where it acquires a consistency and tensile strength comparable with that of vulcanized soft rubber, and then releasing such confinement and completing the vulcanizing of the mass under conditions that cause gas to be evolved within the mass to expand it to produce a closed-cell cellular hard rubber.

2. The method of making closed-cell cellular hard rubber, which comprises rigidly externally confining a mass of hard-rubber compound, heating the confined mass to a temperature which would cause it to swell if unconfined and vulcanizing it under conditions which preclude penetration of gas into the mass from the outside to the point where it acquires a consistency and tensile strength comparable with that of vulcanized soft rubber, and then releasing such confinement and completing the vulcanizing of the mass at a temperature which causes the evolution of gas within the mass and under conditions which permit free expansion of the mass by such gas up to a predetermined limit to produce a closed-cell cellular hard rubber.

3. The method of making closed-cell cellular hard rubber, which comprises rigidly externally confining a mass of hard-rubber compound containing a substantial proportion of sulphur and free from blowing agents, heating the confined mass to a temperature which would cause evolution of hydrogen sulphide gas within the mass if unconfined and vulcanizing it under conditions which preclude penetration of gas into the mass from the outside to the point where it acquires a consistency and tensile strength comparable with that of vulcanized soft rubber, and then releasing such confinement and completing the vulcanizing of the mass at a temperature which causes the evolution of hydrogen sulphide gas within the mass and under conditions which limit the expansion of the mass by said hydrogen sulphide gas to a volume several times its original volume, to produce a closed-cell cellular hard rubber.

4. The method of making closed-cell cellular hard rubber, which comprises incorporating in a hard-rubber compound a blowing agent adapted to evolve gas when heated, rigidly externally confining a mass of the compound, heating the confined mass to a temperature above the gas-evolving temperature of said blowing agent and vulcanizing it under conditions which preclude penetration of gas into the mass from the outside to the point where it acquires a consistency and tensile strength comparable with that of vulcanized soft rubber, and then releasing such confinement and completing the vulcanizing of the mass at a temperature above the gas-evolving temperature of the blowing agent and under conditions which permit such gas to expand the mass and limit such expansion to a volume from twelve to twenty times its original volume.

5. The method of making closed-cell cellular hard rubber, which comprises incorporating in a hard-rubber compound a blowing agent adapted to evolve gas when heated, heating a mass of the compound to a temperature above the gas-evolving temperature of the blowing agent while preventing substantial evolution of the gas within the mass by rigid external confinement of the mass, vulcanizing the confined mass at said temperature to the point where it acquires a consistency and tensile strength comparable with that of vulcanized soft rubber, and then releasing such confinement and completing the vulcanizing of the mass at a temperature above the gas-evolving temperature of the blowing agent under conditions which permit the gas evolved by the blowing agent within the mass to expand it and limit its expansion to a volume from twelve to twenty times its original volume.

6. The method of making closed-cell cellular hard rubber, which comprises rigidly externally confining a mass of hard-rubber compound, heating the confined mass and vulcanizing it under conditions which preclude penetration of gas into the mass from the outside to the point where it acquires a consistency and tensile strength sufficient to prevent entrapped gas from rupturing the rubber, and then releasing such confinement and completing the vulcanizing of the mass under conditions that cause gas to be evolved within the mass to expand it to produce a closed-cell cellular hard rubber.

7. The method of making closed-cell cellular hard rubber, which comprises rigidly externally confining a mass of hard-rubber compound containing a blowing agent adapted to evolve an inflating gas by the action of heat, heating the confined mass to liberate said gas and vulcanizing it while rigidly restraining substantial expansion thereof, said vulcanization being carried to such point that the mass acquires consistency and tensile strength sufficient to prevent entrapped gas from rupturing the rubber, and then releasing such confinement and completing the vulcanizing of the mass to produce a closed-cell cellular hard rubber.

8. A method of making closed-cell cellular hard rubber, which comprises chemically producing an unstable gas within a mass of hard-rubber compound vulcanized to the consistency of vulcanized soft rubber to form closed gas-filled cells therein, completing the vulcanization of the mass while permitting free expansion thereof so that the gas pressure in the cells falls substantially to atmospheric pressure, cooling the mass to make it hard and strong and chemically eliminate a part of the gas in the closed cells of the mass to reduce the gas pressure in the cells below that of the atmosphere.

9. A method of making closed-cell cellular hard rubber, which comprises chemically producing an unstable gas within a mass of hard-rubber compound vulcanized to the consistency of vulcanized soft rubber to form closed gas-filled cells therein, completing the vulcanization under circumstances which allow expansion of the mass, cooling the mass to make it hard and strong and to chemically eliminate the unstable gas in the closed cells of the mass to produce a partial vacuum therein.

10. A method of making closed-cell cellular hard rubber, which comprises producing vapor condensable at or near room temperature within a mass of hard-rubber compound vulcanized to the consistency of vulcanized soft rubber to form closed vapor-filled cells therein, completing the vulcanization of the mass under circumstances allowing expansion of the mass, and cooling the mass to make it hard and strong and to condense the vapor in the closed cells of the mass to produce a partial vacuum therein.

11. A method of making closed-cell cellular hard rubber, which comprises chemically producing an unstable gas to form closed gas-filled cells within a mass of hard-rubber compound vulcanized only to the consistency which will prevent rupture of said cells upon subsequent expansion, completing the vulcanization of the mass while permitting free expansion thereof so that the gas pressure in the cells falls substantially to atmospheric pressure, cooling the mass to make it hard and strong and chemically eliminate a part of the gas in the closed cells of the mass to reduce the gas pressure in the cells below that of the atmosphere.

12. A closed-cell cellular vulcanized hard rubber whose cells contain constituents of a blowing agent.

13. A closed-cell cellular vulcanized hard rubber whose cells contain constituents of a blowing agent and have strong solid rubber walls.

14. A closed-cell cellular vulcanized hard rubber having a density from one-twelfth to one-twentieth of that of solid hard rubber, the cells containing constituents of a blowing agent and having strong solid rubber walls.

15. A closed-cell cellular vulcanized hard rubber whose cells have a partial vacuum therein and contain constituents of a blowing agent.

16. A closed-cell cellular vulcanized hard rubber whose cells have a partial vacuum therein and contain constituents of a blowing agent and have walls of a sufficient strength to prevent collapse under external atmospheric pressure.

17. A closed-cell cellular vulcanized hard rubber having a density of from one-twelfth to one-twentieth of that of solid hard rubber and having cells which have a partial vacuum therein and contain constituents of a blowing agent.

18. A closed-cell cellular vulcanized hard rubber having a density of from one-twelfth to one-twentieth of that of solid hard rubber, the cells having partial vacuum therein and containing constituents of a blowing agent and having walls of sufficient strength to prevent collapse under atmospheric pressure.

19. A closed-cell cellular hard rubber containing cells containing hydrogen sulphide gas and substantially free from other gases.

20. A closed-cell cellular hard rubber having a density of one-third to one-fifth that of solid hard rubber and containing cells filled with hydrogen sulphide gas and substantially free from other gases.

ROBERT L. OVERSTREET.